(12) United States Patent
Barbosa et al.

(10) Patent No.: US 9,756,773 B1
(45) Date of Patent: Sep. 12, 2017

(54) SYSTEM AND METHOD FOR APPLICATION OF MATERIALS THROUGH COORDINATION WITH AUTOMATED DATA COLLECTION VEHICLES

(71) Applicant: INTERNATIONAL BUSINESS MACHINES CORPORATION, Armonk, NY (US)

(72) Inventors: Luciano De Andrade Barbosa, Rio De Janeiro (BR); Matthias Kormaksson, Rio De Janeiro (BR); Cicero Nogueira Dos Santos, Rio De Janeiro (BR); Marcelo Nery Dos Santos, Rio De Janeiro (BR); Bianca Zadrozny, Rio De Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 15/055,185

(22) Filed: Feb. 26, 2016

(51) Int. Cl.
*G01C 23/00* (2006.01)
*A01B 79/00* (2006.01)
(Continued)

(52) U.S. Cl.
CPC .......... *A01B 79/005* (2013.01); *A01C 21/007* (2013.01); *B64C 39/024* (2013.01)

(58) Field of Classification Search
CPC ... A01B 79/005; A01C 21/007; B64C 39/024; G01C 23/00; G01C 23/005; G08G 5/0021; G08G 5/0052; G08G 5/0013
(Continued)

(56) References Cited

U.S. PATENT DOCUMENTS 5,751,576 A * 5/1998 Monson ............... A01M 7/0089
239/161
6,079,340 A * 6/2000 Flamme ............... A01B 79/005
111/178
(Continued)

FOREIGN PATENT DOCUMENTS

CN 102508319 6/2012
CN 103425102 12/2013
(Continued)

OTHER PUBLICATIONS

Singh, Manjeet, et al. "Calibration and Algorithm Development for Estimation of Nitrogen in Wheat Crop Using Tractor Mounted N-Sensor." The Scientific World Journal 2015 (2015).
(Continued)

*Primary Examiner* — Shardul Patel
(74) *Attorney, Agent, or Firm* — F. Chau & Associates, LLC

(57) ABSTRACT

An agricultural material application management system includes an automated agricultural data collection vehicle including a location sensor. The automated agricultural data collection vehicle includes a receiver that receives sensor data including crop information, a memory that stores the plurality of locations and the sensor data, and a processor that generates a mapping correlating the crop information with the plurality of locations in the agricultural area, and generates an agricultural material application recommendation for each of the plurality of locations based on the mapping. The agricultural material application management system includes an agricultural vehicle including an interface unit that interfaces with the automated agricultural data collection vehicle and receives the agricultural material application recommendations from the agricultural data collection vehicle. An agricultural material applicator applies an agricultural material to at least some of the plurality of
(Continued)

locations, and a display provides the recommendations to a driver of the agricultural vehicle.

20 Claims, 5 Drawing Sheets

(51) Int. Cl.
*A01C 21/00* (2006.01)
*B64C 39/02* (2006.01)

(58) Field of Classification Search
USPC .................. 701/3; 239/7, 69, 161; 111/178
See application file for complete search history.

(56) References Cited

U.S. PATENT DOCUMENTS

| 2001/0016788 | A1* | 8/2001 | Hauwiller | A01B 79/005 700/283 |
| 2008/0120129 | A1* | 5/2008 | Seubert | G06Q 10/06 705/35 |
| 2008/0191054 | A1* | 8/2008 | Di Federico | A01B 79/005 239/69 |
| 2012/0234934 | A1* | 9/2012 | Score | E01C 19/203 239/7 |
| 2013/0068892 | A1* | 3/2013 | Bin Desa | B64C 39/024 244/190 |
| 2014/0116153 | A1* | 5/2014 | Stewart | G01F 1/52 73/861 |

FOREIGN PATENT DOCUMENTS

| CN | 203912092 | 10/2014 |
| CN | 104320607 | 1/2015 |
| FR | 3 006 296 | 5/2013 |
| WO | WO 2014/147043 A1 | 9/2014 |

OTHER PUBLICATIONS

Stevens, Don and Olsen, Anthony R., "Spatial Sampling" Colorado State University—College of Natural Sciences Statistics: Index of Presentations [online at the internet:<URL: http://www.stat.colostate.edu/~nsu/starmap/pps/Presentations/>]. [Retrieved on Feb. 11, 2016). Retrieved from the internet:<URL: http://www.stat.colostate.edu/~nsu/starmap/pps/Presentations/Stevens.Olsen.JSM%20Short%20Course.2006.pdf. >.
The Yara N-Sensor Brochure. Yara UK Limited, May 2015 [retrieved on Feb. 11, 2016]. Retrieved from the internet: <URL: http://yara.co.uk/crop-nutrition/knowledge/tools-and-services-literature/n-sensor/>.
Optrx Crop Sensors [online]. Internet:<URL: <http://www.agleader.com/products/directcommand/optrx-crop-sensors> [last visited Feb. 11, 2016].
SenseFly [online]. Internet<URL: <https://www.sensefly.com/applications/gis.html> [last visited Feb. 11, 2016].
Precision Hawk [online]. Internet<URL: <http://www.precisionhawk.com/>. [last visited Feb. 11, 2016].
DIY Drones [online]. Internet<URL: <http://diydrones.com/profiles/blogs/automated-mindstorms-battery-changing-station-fordrones>. [last visited Feb. 11, 2016].

* cited by examiner

SYSTEM AND METHOD FOR APPLICATION OF MATERIALS THROUGH COORDINATION WITH AUTOMATED DATA COLLECTION VEHICLES

BACKGROUND

Exemplary embodiments of the present invention relate to application of materials. More particularly, exemplary embodiments of the present invention relate to a system and method for applying materials through coordination with automated data collection vehicles.

Generally, vehicles applying or spreading a material in an open area will spread the material substantially evenly across the open area. For example, a tractor may spread an agricultural material such as a fertilizer or a pesticide substantially evenly across a field. Thus, each area of a crop planted across the field may receive a substantially equal amount of the agricultural material. However, it may be beneficial to a particular area of the crop to receive more or less of the agricultural material. For example, the particular area of the crop may benefit from a relatively larger amount of fertilizer than another area of the crop, or the particular area of the crop may benefit from not receiving any fertilizer. Additionally, different areas of crops may experience varying degrees of deleterious plant or animal life that may be treatable with varying degrees of pesticides. Thus, a substantially even spreading of agricultural material may result in particular areas of a field receiving more or less than a beneficial amount of fertilizer or pesticide.

It may be desirable to have a system and method for managing the application of materials such as agricultural materials. The application of agricultural materials may be managed by gathering data regarding the status of the area to which the agricultural materials are applied.

SUMMARY

Exemplary embodiments of the present invention provide an agricultural material application management system including an automated agricultural data collection vehicle. The automated agricultural data collection vehicle includes a location sensor that detects a plurality of locations of the automated agricultural data collection vehicle within an agricultural area. The automated agricultural data collection vehicle includes a receiver that receives sensor data including crop information, a memory that stores the plurality of locations and the sensor data, and a processor that generates a mapping correlating the crop information with the plurality of locations in the agricultural area, and generates an agricultural material application recommendation for each of the plurality of locations based on the mapping. The agricultural material application management system includes an agricultural vehicle. The agricultural vehicle includes an interface unit that interfaces with the automated agricultural data collection vehicle and receives the agricultural material application recommendations from the agricultural data collection vehicle. The agricultural vehicle includes an agricultural material applicator that applies an agricultural material to at least one target location in the agricultural area. The at least one target location is one of the plurality of locations or a neighboring location near one of the plurality of locations.

According to an exemplary embodiment of the present invention the automated agricultural data collection vehicle and the agricultural vehicle may communicate with each other in real-time during an agricultural material application procedure.

According to an exemplary embodiment of the present invention the interface unit may receive the agricultural material application recommendations from the agricultural data collection vehicle a plurality of separate times during the agricultural material application procedure.

According to an exemplary embodiment of the present invention the agricultural material application management system may include a cable physically connecting the automated agricultural data collection vehicle and the agricultural vehicle. Power may be provided to the agricultural data collection vehicle from the agricultural vehicle via the cable.

According to an exemplary embodiment of the present invention the agricultural material application recommendations may be provided to the agricultural vehicle from the agricultural data collection vehicle via the cable.

According to an exemplary embodiment of the present invention the receiver may be a wireless receiver. The sensor data may be obtained by a sensor located in the agricultural area that is not part of the automated agricultural data collection vehicle and may be wirelessly transmitted from the sensor to the automated agricultural data collection vehicle via the wireless receiver.

According to an exemplary embodiment of the present invention the receiver may be a sensor that directly obtains the sensor data.

According to an exemplary embodiment of the present invention each agricultural material application recommendation may include one of a first recommendation to increase an amount of the agricultural material applied, a second recommendation to decrease the amount of the agricultural material applied, and a third recommendation to refrain from applying the agricultural material.

According to an exemplary embodiment of the present invention the processor may generate an additional agricultural material application recommendation for a neighboring location near at least one of the plurality of locations.

According to an exemplary embodiment of the present invention the agricultural vehicle may be a tractor and the agricultural material may be a fertilizer.

According to an exemplary embodiment of the present invention the agricultural vehicle may be an aerial vehicle.

Exemplary embodiments of the present invention provide an agricultural material application management system including an automated agricultural data collection vehicle. The automated agricultural data collection vehicle includes a location sensor that detects a plurality of locations of the automated agricultural data collection vehicle within an agricultural area. The automated agricultural data collection vehicle includes a receiver that receives sensor data including crop information, and a memory that stores the plurality of locations and the sensor data. The agricultural material application management system includes an agricultural vehicle including an interface unit that interfaces with the automated agricultural data collection vehicle, and receives the plurality of locations and the sensor data from the agricultural data collection vehicle. The agricultural vehicle includes an agricultural material applicator that applies an agricultural material to at least some of the plurality of locations in the agricultural area. The agricultural vehicle includes a processor that generates a mapping correlating the crop information with the plurality of locations in the agricultural area, and generates an agricultural material application recommendation for each of the plurality of locations based on the mapping. The agricultural vehicle includes a display that provides the agricultural material application recommendations to a driver of the agricultural vehicle.

According to an exemplary embodiment of the present invention the automated agricultural data collection vehicle and the agricultural vehicle may communicate with each other in real-time during an agricultural material application procedure.

According to an exemplary embodiment of the present invention the interface unit may receive the plurality of locations and the sensor data from the agricultural data collection vehicle a plurality of separate times during the agricultural material application procedure.

Exemplary embodiments of the present invention provide an agricultural material application management method including detecting a plurality of locations of an automated agricultural data collection vehicle within an agricultural area. Sensor data including crop information is received at the automated agricultural data collection vehicle. The plurality of locations and the sensor data are stored in a memory. A mapping correlating the crop information with the plurality of locations in the agricultural area is generated. An agricultural material application recommendation is generated for each of the plurality of locations based on the mapping. The agricultural data collection vehicle interfaces with an agricultural vehicle to transmit the plurality of locations and the sensor data, or the agricultural material application recommendations, from the agricultural data collection vehicle to the agricultural vehicle. The agricultural material application recommendations are displayed to a driver of the agricultural vehicle.

According to an exemplary embodiment of the present invention the automated agricultural data collection vehicle and the agricultural vehicle may communicate with each other in real-time during an agricultural material application procedure.

According to an exemplary embodiment of the present invention the agricultural data collection vehicle and the agricultural vehicle may interface with each other a plurality of separate times during the agricultural material application procedure.

According to an exemplary embodiment of the present invention the automated agricultural data collection vehicle and the agricultural vehicle may travel through the agricultural area in synchronization with each other.

According to an exemplary embodiment of the present invention the automated agricultural data collection vehicle may travel to each of the plurality of locations before the agricultural vehicle.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1:
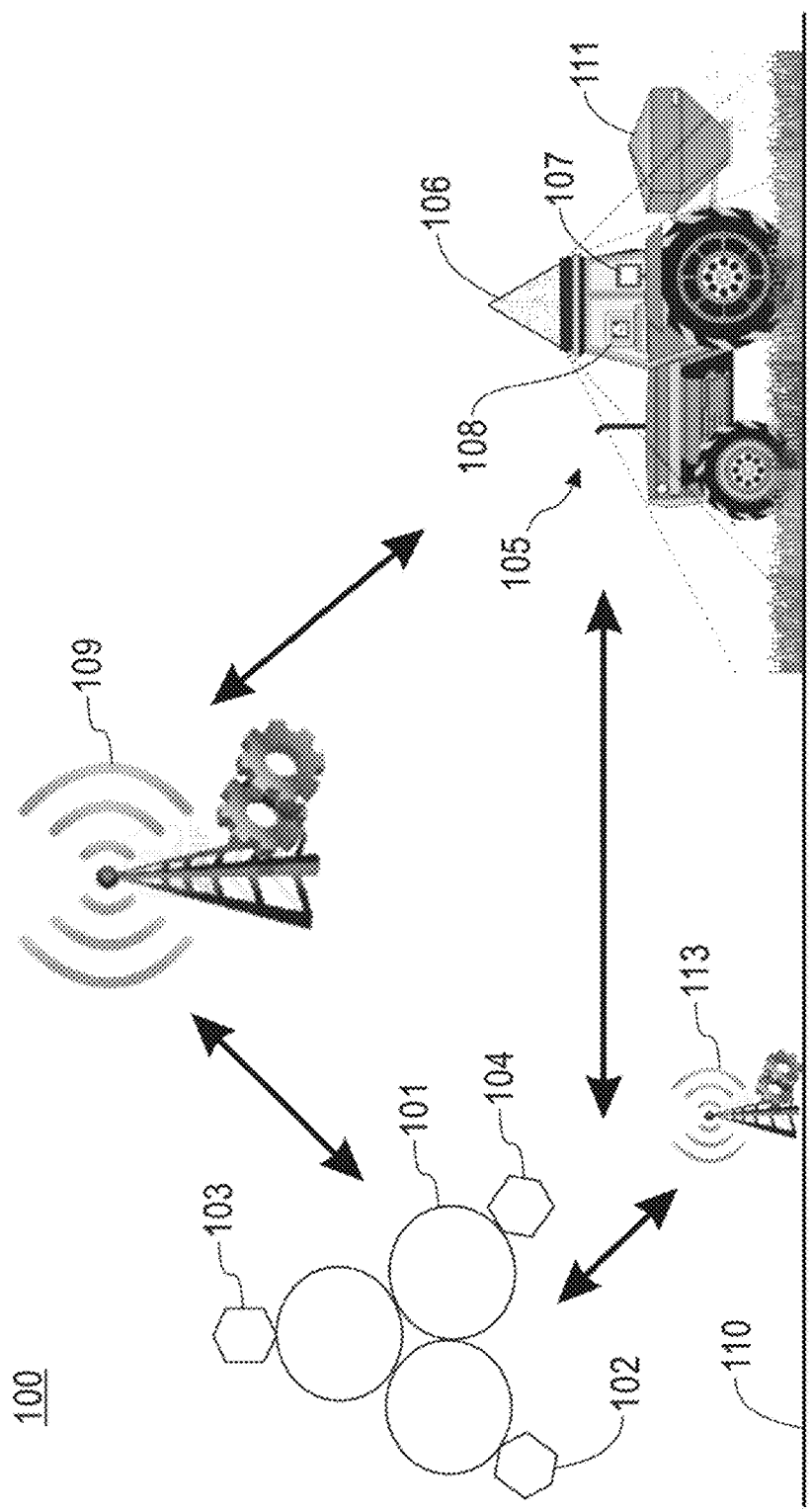
FIG. 1 illustrates an agricultural material application management system according to an exemplary embodiment of the present invention.

An exemplary embodiment of the present invention may provide a system including a first vehicle (e.g., an agricultural vehicle) cooperatively working with a second vehicle, such as an unmanned or automated vehicle (e.g., an unmanned aerial vehicle (UAV), such as a drone), to collect data and generate recommendations regarding delivery of one or more materials (e.g., agricultural materials) in a particular area. For example, an exemplary embodiment of the present invention may include one or more drones cooperatively working with one or more agricultural vehicles to deliver one or more agricultural materials (e.g., fertilizer, or pesticide) in a field.

Unmanned or automated vehicles according to exemplary embodiments of the present invention may include vehicles traveling on air or on the ground. For example, vehicles traveling on air may include aerial vehicles such as drones, balloons, planes, helicopters or other aircraft. Vehicles traveling on the ground may include cars, truck or all terrain vehicles, for example. However, exemplary embodiments of the present invention are not limited to a particular type of automated or unmanned vehicle and any desired automated or unmanned vehicle may be used.

According to an exemplary embodiment of the present invention, a drone may collect data, by flying ahead of vehicle to evaluate field, and provide "ahead-of-time" recommendations to vehicle on product application.

The system and method according to an exemplary embodiment of the present invention may include real-time dynamic communication between a drone and an agricultural vehicle as each move through a field together. For example, the drone may fly ahead of the agricultural vehicle to detect whether and how much fertilizer, or pesticide should be distributed in each area of the field and report a recommendation back to the agricultural vehicle regarding the fertilizer or pesticide. Thus, the drone and the agricultural vehicle may communicate dynamically and decisions regarding efficient agricultural product application may be dynamically determined in real-time as the drone and the agricultural vehicle traverse a particular field together.

Exemplary embodiments of the present invention will be described more fully hereinafter with reference to the accompanying drawings. Like reference numerals may refer to like elements throughout the specification and drawings.

FIG. 1 illustrates an agricultural material application management system according to an exemplary embodiment of the present invention.

Referring to FIG. 1, exemplary embodiments of the present invention provide an agricultural material application management system 100 including an automated agricultural data collection vehicle 101. The automated agricultural data collection vehicle 101 may include a location sensor 102 that detects a plurality of locations of the automated agricultural data collection vehicle 101 within an agricultural area 110. The automated agricultural data collection vehicle 101 may include a receiver 103 that receives sensor data including crop information, a memory that stores the plurality of locations and the sensor data, and a processor that generates a mapping correlating the crop information with the plurality of locations in the agricultural area, and generates an agricultural material application recommendation for each of the plurality of locations based on the mapping. The memory and the processor may be embodied in a processing unit 104. The agricultural material application management system may include an agricultural vehicle 105. The agricultural vehicle 105 may include an interface unit 106 that interfaces with the automated agricultural data collection vehicle 101 and receives the agricultural material application recommendations from the automated agricultural data collection vehicle 101. The agricultural vehicle 105 may include an agricultural material applicator 111 that may apply an agricultural material to at least some of the plurality of locations in the agricultural area 110, and a display 107 that provides the agricultural material application recommendations to a driver of the agricultural vehicle 105.

According to an exemplary embodiment of the present invention the agricultural vehicle 105 may be a tractor and the agricultural material may be a fertilizer.

Figure 2:
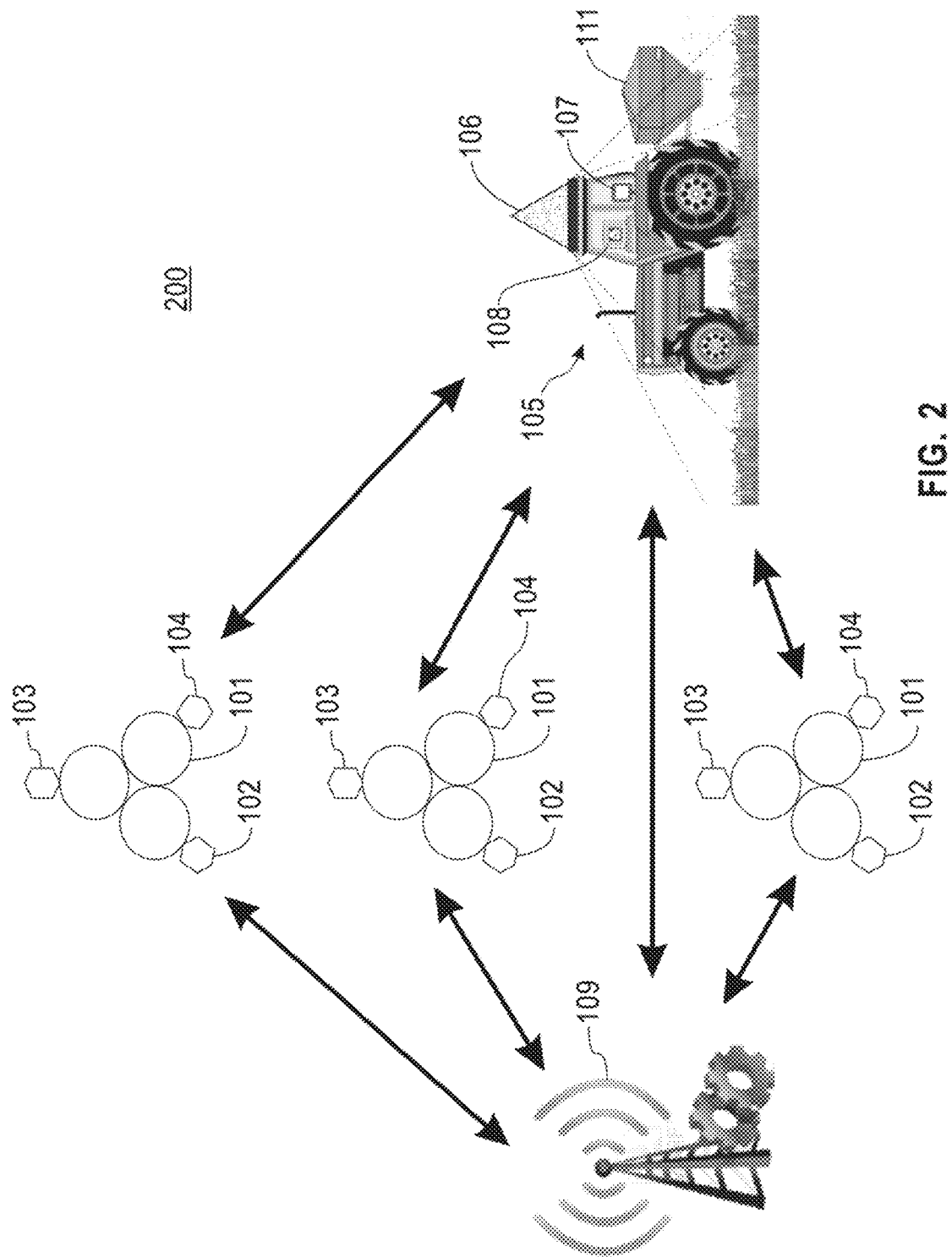
FIG. 2 illustrates an agricultural material application management system according to an exemplary embodiment of the present invention.

According to an exemplary embodiment of the present invention the automated agricultural data collection vehicle 101 may include a plurality of automated agricultural vehicles (see, e.g., FIG. 2). Each of the plurality of automated agricultural data collection vehicles 101 may be substantially the same as each other, and each may communicate with the agricultural vehicle 105. Alternatively, the data collection vehicles 101 may be different from each other, and may include, for example, different sensors and/or different receivers from each other.

The automated agricultural data collection vehicle 101 may be an unmanned (e.g., an unmanned aerial vehicle (UAV), such as a drone) or automated vehicle, such as vehicles traveling on air or on the ground. For example, vehicles traveling on air may include aerial vehicles such as drones, balloons, planes, helicopters or other aircraft. Vehicles traveling on the ground may include cars, truck or all terrain vehicles, for example. However, exemplary embodiments of the present invention are not limited to a particular type of automated or unmanned vehicle and any desired automated or unmanned vehicle may be used.

According to an exemplary embodiment of the present invention the automated agricultural data collection vehicle 101 and the agricultural vehicle 105 may communicate with each other in real-time during an agricultural material application procedure. The agricultural material application management system 100 may include real-time dynamic communication between the automated agricultural data collection vehicle 101 and agricultural vehicle 105 as each move through the agricultural area 110 together. For example, the automated agricultural data collection vehicle 101 may fly ahead of the agricultural vehicle 105 to detect whether and how much fertilizer, or pesticide should be distributed in each area of the field and report a recommendation back to the agricultural vehicle 105 regarding the fertilizer or pesticide. Thus, the automated agricultural data collection vehicle 101 and the agricultural vehicle 105 may communicate dynamically and decisions regarding efficient agricultural product may be dynamically determined in real-time as the automated agricultural data collection vehicle 101 and the agricultural vehicle 105 traverse the agricultural area 110 together. That is, data collection by the automated agricultural data collection vehicle 101 and dynamic delivery of agricultural material may occur substantially simultaneously, and without an appreciable delay between data acquisition and material delivery.

According to an exemplary embodiment of the preset invention the material application recommendations described herein may be generated by including data gathered from the Cloud. Data from the cloud may be gathered by the agricultural vehicle 105 and/or the automated agricultural data collection vehicle 101. Data gathered from the cloud may include data that is obtained from one or more Cloud based services, such as meteorological services. For example, Cloud based services may predict, wind, temperature and other properties with relatively high resolution, and predictions such as wind speeds over a forthcoming period of time (e.g., 30-60 minutes in the future) may be made by such Cloud based services. Thus, data and predictions from Cloud based services may be gathered and employed by the agricultural vehicle 105 and/or the automated agricultural data collection vehicle 101 and may be used in generating the material application recommendations described herein. For example, the data and predictions gathered from the Cloud based services may be used in conjunction with local or automated vehicle sensor data to dynamically generate continually updated material application recommendations.

According to an exemplary embodiment of the present invention the interface unit 106 may receive the agricultural material application recommendations from the agricultural data collection vehicle 101 a plurality of separate times during the agricultural material application procedure.

The agricultural area 110 according to an exemplary embodiment of the present invention may be a particular farm, field or crop area. For example, the agricultural area 110 may be an area planted with a particular type of crop, such as corn. However, exemplary embodiments of the present invention are not limited to a particular area, and the agricultural area 110 may be any desired area.

According to an exemplary embodiment of the present invention the receiver 103 may be a wireless receiver. The sensor data may be obtained by a sensor 113 located in the agricultural area that is not part of the automated agricultural data collection vehicle 101 and may be wirelessly transmitted from the sensor 113 to the automated agricultural data collection vehicle 101 via the wireless receiver 103. The automated agricultural data collection vehicle 101 may also physically dock with field sensors 113 and/or the agricultural vehicle 105 to receive or transfer crop information.

According to an exemplary embodiment of the present invention the receiver 103 may be a sensor that directly obtains the sensor data. That is, the automated agricultural data collection vehicle 101 may directly obtain crop data. For example, the receiver 103 may be disposed on the automated agricultural data collection vehicle 101 and may obtain the crop data directly from the agricultural area 110.

The receiver 103 according to an exemplary embodiment of the present invention may be a wireless radio. For example, the receiver 103 may communicate with the agricultural vehicle 105 through WiFi, cellular or Bluetooth communication, however, exemplary embodiments of the present invention are not limited thereto and the receiver 103 may be any type of desired communication device.

The crop information received by the receiver 103 may include information regarding existing crops (e.g., health, relative size of crops, maturity of crops), and information regarding soil conditions. For example, the crop information may include information regarding areas that are planted, areas that include relatively immature crops, areas that include relatively mature crops and areas that are not planted or include dead/cleared crops. The crop information may include information regarding soil conditions, such as alkalinity levels, or nitrogen and phosphorous levels. The crop information may include information regarding pests, microorganisms or other health related aspects of a particular crop. Soil conditions, for example, may be used to recommend areas for planting seeds for future crops, or areas to avoid when planting seeds (e.g., areas that do not contain sufficient nitrogen content). However, exemplary embodiments of the present invention are not limited thereto, and the crop information may include any information relevant to current, future, or past crops.

The processor according to an exemplary embodiment of the present invention may generate a mapping correlating the crop information with the plurality of locations in the agricultural area 110. The mapping links the crop information to the corresponding location for which the crop information refers to. The mapping may utilize a variety of data structures such as, for example, a table, a listing, a chart, etc. However, the mapping is not limited thereto. For example, the mapping may be any type of data structure that may be generated, stored, and read that correlates the crop information included in the sensor data with the corresponding location that the sensor data was received in. The processor may subsequently generate an agricultural material application recommendation for each of the plurality of locations based on the mapping. For example, the recommendation may be for the agricultural vehicle 105 to spread fertilizer in one particular area of the mapping, but not in another particular area in the mapping. The recommendation may be for the agricultural vehicle 105 to spread fertilizer in one location and to spread a particular pesticide in another location.

According to an exemplary embodiment of the present invention one or more algorithms may be used to generate an agricultural material application recommendation. The algorithm may be a mathematical formula relating measurements obtained by the sensors (e.g., reflectance) according to exemplary embodiments of the present invention with a determined amount of agricultural material (e.g., Nitrogen) desired according to one or more characteristics of the field or crop being evaluated.

An example of such an algorithm involves a mathematical formula relating a sufficiency index (SI) measured from wheat crop sensors to recommended Nitrogen application ($N_{app}$):

$$N_{app} = R\sqrt{SI_R - SI_{sensor}}$$

Where R and $SI_R$ terms are calculated numbers determined by expert knowledge or theoretical knowledge (e.g. biology or physics based principles) or from statistical analysis of real time or historical data sets. The above mathematical formula may be written as $$N_{app} = f(SI_{sensor})$$

where $f(\cdot)$ is a mathematical formula such as $f(SI_{sensor}) = R\sqrt{SI_R - SI_{sensor}}$ in the previous formulation that relates the measurements obtained from the sensors with a determined amount of agricultural material. The algorithms according to exemplary embodiments of the present invention are not limited thereto, and $N_{app}$ may be substituted with other soil or field contents, such as oxygen, water, minerals, fertilizers, nitrates, nitrites, ammonium, or any other contents, as desired. Similarly the sufficiency index $SI_{sensor}$ may be substituted with other sensor measurements and is not limited to measurements from one type of sensor, e.g. $SI_{sensor}$ may be substituted by the triplet (e.g., Biomass Index, Nitrogen Level, Reflection) measured from three different sensors. The function $f(\cdot)$ may be substituted by any analytical mathematical function (e.g. derived from biology or physics) or a computational function (e.g. obtained from a Machine Learning algorithm) that calculates output for a given input. This function may further incorporate spatial coordinates as input and thus facilitate spatial smoothing or interpolation for making recommendations in areas where no sensor measurements are available (e.g. on neighboring locations near one of the plurality of sensor locations). In this particular example the R and $SI_R$ terms are calculated from the formulas:

$$R = \sqrt{\frac{-b_1}{a_2}},$$

$$SI_R \frac{4a_2 a_0 - a_1^2 - 4a_2 b_0}{4a_2 b_1}$$

where the coefficients $a_0, a_1, a_2, b_0, b_1$ are obtained from a linear regression analysis involving the following two regression models:

$$SI_{SPAD} = a_0 + a_1 * N_{rate} + a_2 * (N_{rate})^2$$

$$SI_{SPAD} = b_0 + b_1 * SI_{sensor}$$

$SI_{SPAD}$ is sufficiency index calculated from a sensor (e.g. a chlorophyll meter) and $N_{rate}$ refers to Nitrogen rate.

Note that in order to calculate the coefficients you may use data sets involving the pairs of measurements:

($N_{rate}$, $SI_{SPAD}$) and ($SI_{SPAD}$, $SI_{sensor}$)

that form the basis for regression analysis. Alternatively, theoretical knowledge (e.g. biology or physics) of the above relationships between ($N_{rate}$, $SI_{SPAD}$) and ($SI_{SPAD}$, $SI_{sensor}$) may be used to estimate the coefficients. In other cases an expert may provide estimates of these numbers based on domain knowledge. Note that a sufficiency index may be calculated using the following equation:

$$SI = \frac{\text{Target Reflectance}}{\text{Reference Reflectance}}$$

The SI value may be a measurement of Nitrogen (N) sufficiency. An SI value of 1 may mean the crop is N sufficient and no N is needed, and an SI value of less than 1 may mean the crop is deficient and additional N may be used (e.g., more N may be needed as the SI value decreases). For example, if the reference strip reflectance value is more target area reflectance value may be low. When SI value is calculated it may be relatively small. Thus, the target area may be N deficient and more N will be added.

According to an exemplary embodiment of the present invention the processor may generate an additional agricultural material application recommendation for a neighboring location near at least one of the plurality of locations.

The agricultural vehicle 105 may include an agricultural material applicator that applies an agricultural material to at least one target location in the agricultural area. The at least one target location may be one of the plurality of locations or a neighboring location near one of the plurality of locations.

According to an exemplary embodiment of the present invention, agricultural material application recommendations may be generated for locations which have not been directly sampled or tested. Data collected from one or more locations may be used to extrapolate to other locations. For example, data from a sampled location may be used to extrapolate data for surrounding, adjacent or neighboring locations to generate recommendations for the surrounding, adjacent or neighboring locations that were not directly tested or sampled by the agricultural data collection vehicle 101. A neighboring location may include a location that is directly adjacent to at least one target location. Alternatively, a neighboring location may be a location that is in the general vicinity of a target location, and which has one or more similar attributes to the target location, and thus would be expected to benefit from a similar agricultural material application. For example, similar attributes may include similar slope or grade, similar tree cover, similar planting histories, similar previously recorded soil sample contents or moisture content. However, exemplary embodiments of the present invention are not limited thereto, and any desired attribute may be considered in determining agricultural material application in target areas or neighboring areas.

According to an exemplary embodiment of the present invention a neighboring location might not benefit from a same or similar agricultural material application as in a target location and a different material application may be performed in the neighboring location. For example, (e.g., in the case of statistical interpolation) if empirical studies show that Nitrogen recommendations seem to increase linearly from North to South then a linear interpolation may be performed to determine the recommendation between two target locations (e.g., one North and other South). If a neighboring location was, for example, substantially in the middle between the two target locations then the average of the two target locations might be used to determine the recommended material application scheme between the two sites.

According to an exemplary embodiment of the present invention each agricultural material application recommendation may include one of a first recommendation to increase an amount of the agricultural material applied, a second recommendation to decrease the amount of the agricultural material applied, and a third recommendation to refrain from applying the agricultural material. The material application recommendation may include a fourth recommendation to maintain a level (e.g., a current level) of applied material.

The memory and the processor of the agricultural material application management system according to exemplary embodiments of the present invention may be embodied in a back-end system, and the back end-system may be configured to perform the method of agricultural material application management according to exemplary embodiments of the present invention.

The back-end system according to an exemplary embodiment of the present invention may be disposed in the automated agricultural data collection vehicle 101. For example, the back-end system may be disposed in at least one of a plurality of automated agricultural data collection vehicles 101 and may communicate with each of the plurality of automated agricultural data collection vehicles 101. The back-end system according to an exemplary embodiment of the present invention may be disposed in the agricultural vehicle 105. For example, the back-end system may be embodied in one or more computers 108 disposed in the agricultural vehicle 105. The back-end system according to an exemplary embodiment of the present invention may be disposed in a location away from the automated agricultural data collection vehicle 101 and the agricultural vehicle 105. Thus, the automated agricultural data collection vehicle 101 and/or the vehicle 105 may communicate with the back-end system according to exemplary embodiments of the present invention. The automated agricultural data collection vehicle 101 and/or the vehicle 105 may communicate with the back-end system according to exemplary embodiments of the present invention through WiFi, cellular or Bluetooth communication, however, exemplary embodiments of the present invention are not limited thereto, and communication with the back-end system may occur through any desired form of communication.

The agricultural material application recommendation may be delivered to the driver of the agricultural vehicle 105 on the display 107. The display 107 may be a computer screen or an LCD monitor, however, exemplary embodiments of the present invention are not limited thereto. For example, the recommendation may be delivered to the driver on the one or more computers 108 disposed in the agricultural vehicle 105.

The computer 108 may include one or more interfaces for receiving sensor inputs containing crop information, a mapper or mapping unit that creates one or more map outputs. The map outputs may include crop information and material/fertilizer recommendations at associated crop position in a field.

The sensors (e.g., the location sensors 102 or the sensors 113) according to an exemplary embodiment of the present invention may include one or more of passive on-ground sensors such as RFID tag, soil moisture, temperature, nitrogen, or electrical conductivity sensors and others. The sensors may be on-drone sensors capable of capturing high-altitude field images such as GIS, Multispectral images, thermal images, or LiDAR. On-drone or on-vehicle sensors may capture crop or soil measurements, such as nitrogen/biomass sensors. The sensors may be disposed in the field or may be disposed on the automated agricultural data collection vehicle 101, as described above in more detail.

According to an exemplary embodiment of the present invention, the automated agricultural data collection vehicle 101 may include the location sensors 102 or the sensors 113. That is, the agricultural data collection vehicle 101 may have the sensors according to exemplary embodiments of the present invention embodied therewith, and a receiver 103 may be omitted. That is, the agricultural data collection vehicle 101 may collect location or other data directly.

The automated agricultural data collection vehicle 101 (e.g., drone) may travel over the field at a relatively high altitude (e.g., a height greater than 30 ft) and may capture field images such as GIS, Multispectral images, thermal images, or LiDAR. The automated agricultural data collection vehicle 101 (e.g., drone) may travel over the field at a relatively low altitude (e.g., a height between 1-30 feet) and may capture crop or soil measurements, either with on-drone sensors or by communicating with energy-efficient on-ground sensors that communicate with the drone through low power and short-range radio, for example.

The agricultural material application management system 100 according to an exemplary embodiment of the present invention may include one or more relay towers 109. The relay towers 109 may communicate with the automated agricultural data collection vehicle 101 and may relay a signal from the automated agricultural data collection vehicle 101 to the back-end system and/or to the agricultural vehicle 105. The relay tower 109 may communicate with the back-end system or the agricultural vehicle 105 and may relay a signal from the back-end system or the agricultural vehicle 105 to the automated agricultural data collection vehicle 101. The automated agricultural data collection vehicle 101 may communicate with the agricultural vehicle 105 directly without relaying a signal through the relay tower 109.

According to an exemplary embodiment of the present invention, an ad hoc network may be employed in addition to, or as an alternative to employing the relay tower 109. Thus, it is possible for the agricultural material application management system 100 according to an exemplary embodiment of the present invention to operate without the use of a physical or fixed antenna or without a physical network infrastructure. For example, nodes of the ad hoc network may communicate directly with each other, without employing the relay tower 109 or another physical network infrastructure component.

FIG. 2 illustrates an agricultural material application management system according to an exemplary embodiment of the present invention.

Referring to FIG. 2, an agricultural material application management system 200 according to an exemplary embodiment of the present invention may include a plurality of automated agricultural data collection vehicles 101. Each of the plurality of automated agricultural data collection vehicles 101 may be substantially the same as each other, or may be different from each other as described herein. The automated agricultural data collection vehicles 101 may each communicate with the agricultural vehicle 105, as described above with reference to FIG. 1. The agricultural material application management system 200 may be substantially the same as the agricultural material application management system 100 except for including a plurality of automated agricultural data collection vehicles 101.

According to an exemplary embodiment of the present invention, each of the plurality of automated agricultural data collection vehicles 101 may receive sensor data including crop information from different locations or regions in the agricultural area 110.

Figure 3:
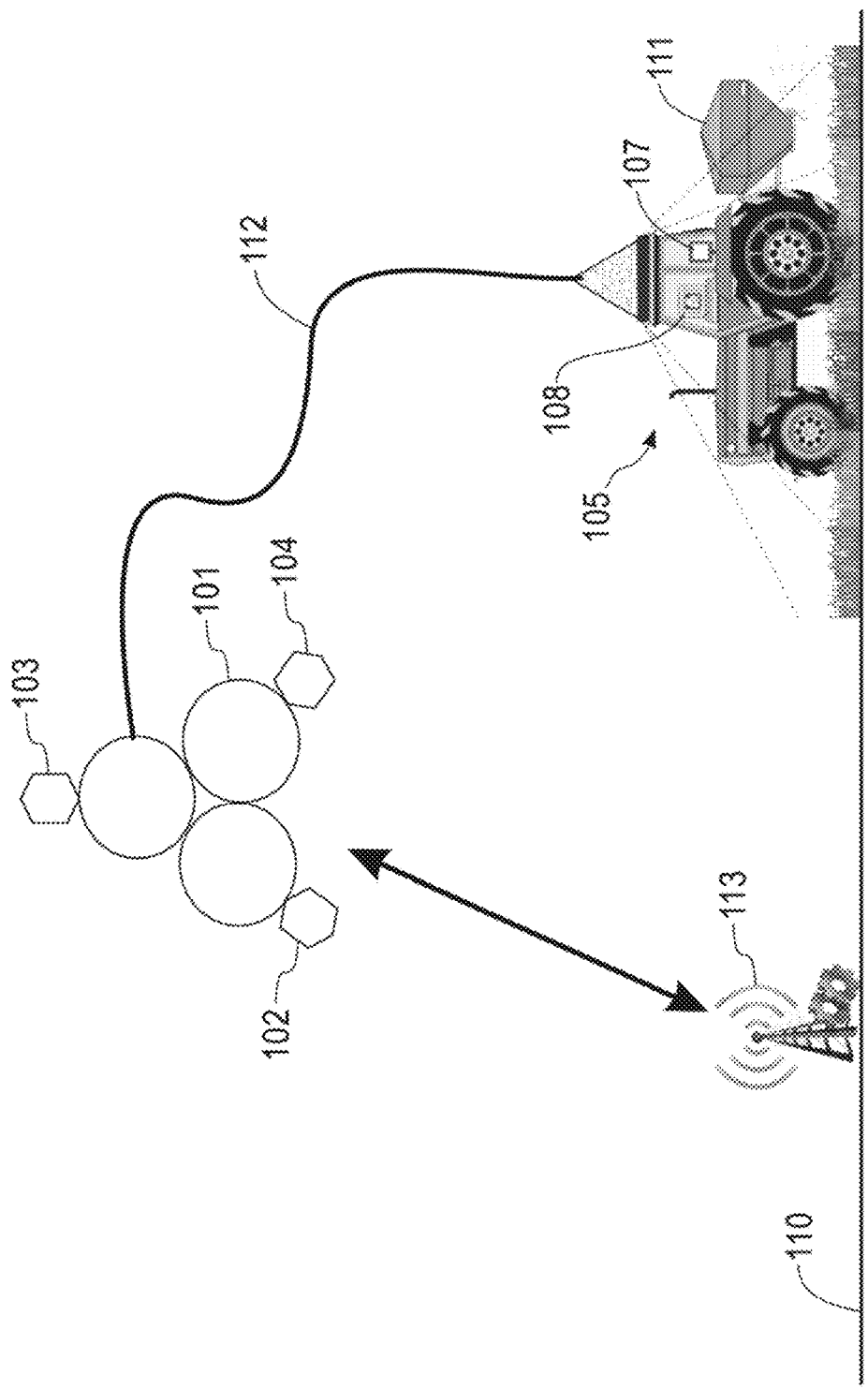
FIG. 3 illustrates an agricultural material application management system according to an exemplary embodiment of the present invention.

FIG. 3 illustrates an agricultural material application management system according to an exemplary embodiment of the present invention.

Referring to FIG. 3, the agricultural material application management system according to an exemplary embodiment of the present invention may include a cable 112 physically connecting the automated agricultural data collection vehicle 101 and the agricultural vehicle 105. Power may be provided to the agricultural data collection vehicle 101 from the agricultural vehicle 105 via the cable 112. A plurality of cables 112 may physically connect the plurality of automated agricultural data collection vehicles 101 to the agricultural vehicle 105.

According to an exemplary embodiment of the present invention the agricultural material application recommendations may be provided to the agricultural vehicle 105 from the agricultural data collection vehicle 101 via the cable 112.

Figure 4:
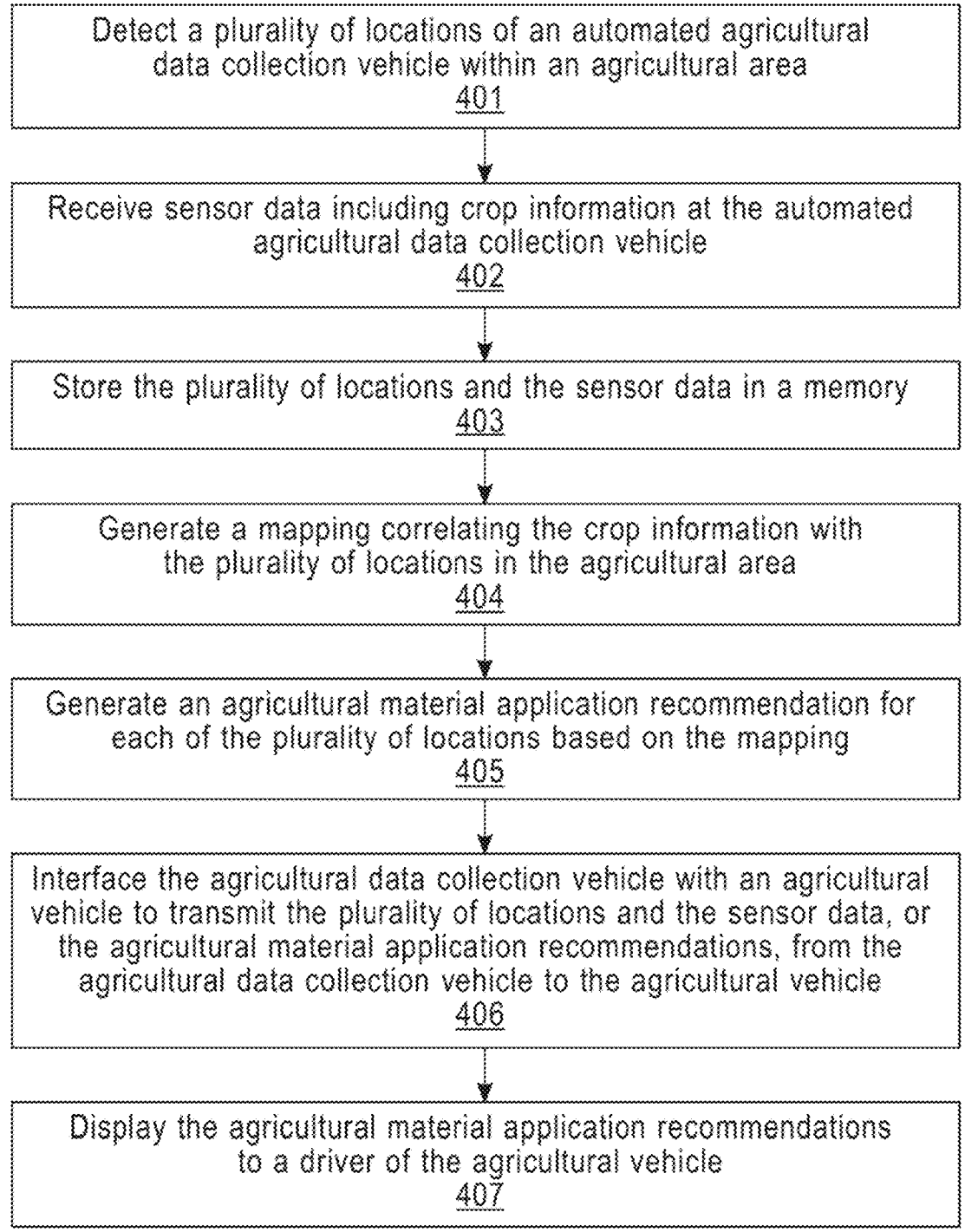
FIG. 4 is a flowchart illustrating an agricultural material application management method according to an exemplary embodiment of the present invention.

FIG. 4 is a flowchart illustrating an agricultural material application management method according to an exemplary embodiment of the present invention.

Referring to FIG. 4, an agricultural material application management method according to an exemplary embodiment of the present invention may include detecting a plurality of locations of an automated agricultural data collection vehicle within an agricultural area 401. Sensor data including crop information is received at the automated agricultural data collection vehicle 402. The plurality of locations and the sensor data are stored in a memory 403. A mapping correlating the crop information with the plurality of locations in the agricultural area is generated 404. An agricultural material application recommendation is generated for each of the plurality of locations based on the mapping 405. The agricultural data collection vehicle interfaces with an agricultural vehicle to transmit the plurality of locations and the sensor data, or the agricultural material application recommendations, from the agricultural data collection vehicle to the agricultural vehicle 406. The agricultural material application recommendations are displayed to a driver of the agricultural vehicle 407.

According to an exemplary embodiment of the present invention, the agricultural material application management method may take into consideration any number of desired dynamic factors. For example, current wind conditions and ambient air temperatures may influence how the agricultural vehicle 107 should apply agricultural materials in a particular area.

According to an exemplary embodiment of the present invention the automated agricultural data collection vehicle 101 and the agricultural vehicle 105 may travel through the agricultural area 110 in synchronization with each other. According to an exemplary embodiment of the present invention the automated agricultural data collection vehicle 101 and the agricultural vehicle 105 may communicate with each other in real-time during an agricultural material application procedure. The agricultural material application management system 100 may include real-time dynamic communication between the automated agricultural data collection vehicle 101 and agricultural vehicle 105 as each move through the agricultural area 110 together. For example, the automated agricultural data collection vehicle 101 may fly ahead of the agricultural vehicle 105 to detect whether and how much fertilizer, or pesticide should be distributed in each area of the field and report a recommendation back to the agricultural vehicle 105 regarding the fertilizer or pesticide. Thus, the automated agricultural data collection vehicle 101 and the agricultural vehicle 105 may communicate dynamically and decisions regarding efficient agricultural product application may be dynamically determined in real-time as the automated agricultural data collection vehicle 101 and the agricultural vehicle 105 traverse the agricultural area 110 together. That is, data collection by the automated agricultural data collection vehicle 101 and dynamic delivery of agricultural material may occur substantially simultaneously, and without an appreciable delay between data acquisition and material delivery.

According to an exemplary embodiment of the present invention the interface unit 106 may receive the agricultural material application recommendations from the agricultural data collection vehicle 101 a plurality of separate times during the agricultural material application procedure.

According to an exemplary embodiment of the present invention the automated agricultural data collection vehicle 101 may travel to each of the plurality of locations before the agricultural vehicle 105.

According to an exemplary embodiment of the present invention each agricultural material application recommendation may include one of a first recommendation to increase an amount of the agricultural material applied, a second recommendation to decrease the amount of the agricultural material applied, and a third recommendation to refrain from applying the agricultural material.

The memory 103 and the processor 104 of the agricultural material application management system according to exemplary embodiments of the present invention may be embodied in the back-end system, and the back end-system may be configured to perform the method of agricultural material application management according to exemplary embodiments of the present invention.

The back-end system according to an exemplary embodiment of the present invention may be disposed in the automated agricultural data collection vehicle 101. For example, the back-end system may be disposed in at least one of a plurality of automated agricultural data collection vehicles 101 and may communicate with each of the plurality of automated agricultural data collection vehicles 101. The back-end system according to an exemplary embodiment of the present invention may be disposed in the agricultural vehicle 105. For example, the back-end system may be embodied in the one or more computers 108 disposed in the agricultural vehicle 105. The back-end system according to an exemplary embodiment of the present invention may be disposed in a location away from the automated agricultural data collection vehicle 101 and the agricultural vehicle 105. Thus, the automated agricultural data collection vehicle 101 and/or the vehicle 105 may communicate with the back-end system according to exemplary embodiments of the present invention. The automated agricultural data collection vehicle 101 and/or the vehicle 105 may communicate with the back-end system according to exemplary embodiments of the present invention through WiFi, cellular or Bluetooth communication, however, exemplary embodiments of the present invention are not limited thereto, and communication with the back-end system may occur through any desired form of communication.

The back-end system according to an exemplary embodiment of the present invention may embody the computers according to exemplary embodiments of the present invention (e.g., the computer described in more detail below with reference to FIG. 5), and the back-end system may execute the program instructions or the methods described according to exemplary embodiments of the present invention.

Figure 5:
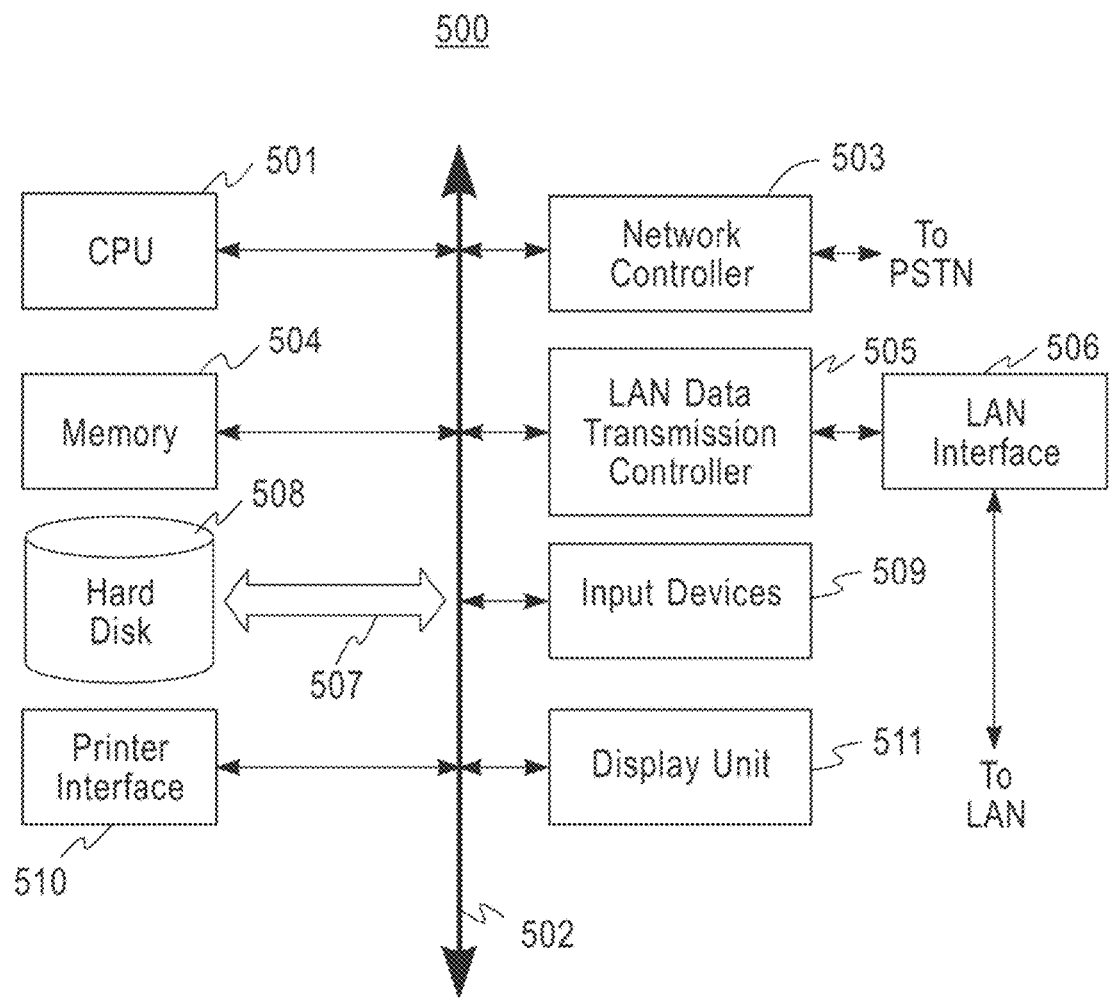
FIG. 5 illustrates a computer system capable of implementing a method according to exemplary embodiments of the present invention.

FIG. 5 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 500 may include, for example, a central processing unit (CPU) 501, random access memory (RAM) 504, a printer interface 510, a display unit 511, a local area network (LAN) data transmission controller 505, a LAN interface 506, a network controller 503, an internal bus 502, and one or more input devices 509, for example, a keyboard, mouse etc. As shown, the system 500 may be connected to a data storage device, for example, a hard disk, 508 via a link 507.

First Exemplary Scenario

A drone according to an exemplary embodiment of the present invention may scan a field before an agricultural vehicle enters and thus provide recommendations on whether product application is desirable and how much product should be applied. Providing recommendations for product application (e.g., fertilizer application) may increase efficiency of product application, thus saving time and money, reducing crop damage, and reducing or eliminating calibration lags of an agricultural vehicle. For example, the agricultural vehicle may be preprogrammed with recommendations before entering field, and/or may be dynamically directed while traversing through a field by receiving real-time recommendations.

The drone may fly at relatively high altitude and capture images of a field such as GIS, Multispectral images, thermal images, and/or LiDAR. Thus, data may be provided and used to build maps and field recommendations using statistical analyses and interpretations of agronomists.

The drone may fly with built-in or attached sensors at relatively low altitude, such as immediately above plants, to capture more detailed crop or soil measurements. This approach may increase the fidelity of generated recommendations at sample locations.

The drone may fly at relatively low altitude and collect information from on-ground sensors, such as RFID, soil moisture, temperature, nitrogen, electrical conductivity and others.

This approach may facilitate the use of low-cost, energy-efficient sensors that may communicate with the drone through low power and short-range radio frequencies. This approach may be particularly useful in areas where GPS or long-range-radio signal coverage is relatively low.

The drone may fly and land at certain field locations to collect actual crop or soil samples. This approach may provide field data that may be analyzed in a laboratory to provide information for sample locations.

The drone may gather a plurality of samples from the field by flying over it. The drone may gather a plurality of samples (e.g., 50 substantially equally spaced samples) across the field without visiting every plant or every geographic location in the field. While it may be possible to test substantially every plant or substantially every geographic location in a particular field according to exemplary embodiments of the present invention, taking a plurality of strategically located samples may reduce the number of samples while maintaining recommendation fidelity for agricultural material application. After taking a relatively small number of samples at a number of geographic locations, interpolation, as described herein, may be employed to generate recommendations to neighboring locations without taking samples at every location or at every plant in a particular geographic area. Interpolation may be performed by a number of methods using a configured commercial statistical application. An example of one such interpolation method is kriging. Kriging determines a weighted average at neighbor location, where sample measurement has not been taken, using available sensor measurements at sampled locations. More particularly, for neighbor location i that has not been sampled, a weighted average can be determined as:

$$\hat{x}_i = \Sigma_{j \in S} \text{weight}(\text{dist}_{ij}) \cdot x_j, \quad (1)$$

where $\text{dist}_{ij}$ denotes the distance between sampled location j and neighbor location i, S denotes the set of sampled locations and $x_j$ denotes the sensor measurement taken at sampled location j. The kriging weights can be obtained by using a configured commercial statistical application. The quantity in equation (1) $\hat{x}_i$ can be used to generate recommendation to neighboring location i.

Second Exemplary Scenario

A drone and agricultural vehicle according to an exemplary embodiment of the present invention may move together through the field, with the drone always staying one step ahead of the vehicle. The drone may collect data in front of the vehicle and provide recommendations on how much product should be applied. This approach may increase recommendation accuracy and reduce or eliminate calibration lags. This approach may reduce or eliminate response time to prepare for product application. According to an exemplary embodiment of the present invention, this approach may take into consideration any number of desired dynamic factors. For example, current wind conditions and ambient air temperatures may influence how the agricultural vehicle 107 should apply agricultural materials in a particular area.

For example, the drone may fly ahead of vehicle while being powered by a cable strung between vehicle and drone. This approach may allow the drone to collect data in front of the agricultural vehicle and provide "ahead-of-time" recommendations for product application.

The drone may fly ahead of the agricultural vehicle while being powered by battery.

After working ahead of the agricultural vehicle and gaining a time advantage (e.g., a 30 minute time advantage) over the agricultural vehicle (e.g., a tractor) the drone may return to and physically dock with the agricultural vehicle for recharging (or exchanging) of batteries, and/or to pass or receive data and recommendations with the agricultural vehicle.

Optimal meeting points or times for the drone and the agricultural vehicle may be determined to maximize the actual work performed by the drone while minimizing flight time back to vehicle, thus conserving battery life and increasing the amount of time that the drone and the agricultural vehicle can continuously work in the field.

Third Exemplary Scenario

A drone according to an exemplary embodiment of the present invention may scan a field before an agricultural vehicle enters and thus provide recommendations on whether product application is desirable and how much product should be applied according to the first exemplary scenario described above and a drone and agricultural vehicle according to an exemplary embodiment of the present invention may also move together through the field, with the drone always staying one step ahead of the vehicle according to the second exemplary scenario described above. That is, the first and second exemplary scenarios may both be exercised. For example, the first exemplary scenario may be used for relatively low resolution evaluation of a field, while the second exemplary scenario may be used for relatively detailed high resolution evaluations, and thus an accuracy of the recommendations according to exemplary embodiments of the present invention may be increased.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the figures illustrate the architecture, functionality, and operation of possible implementations of systems, methods, and computer program products according to various exemplary embodiments of the invention. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. An agricultural material application management system, comprising:
   an automated agricultural data collection vehicle, comprising:
      a location sensor that detects a plurality of locations of the automated agricultural data collection vehicle within an agricultural area;
      a receiver that receives sensor data including crop information;
      a memory that stores the plurality of locations and the sensor data;
      a processor that generates a mapping correlating the crop information with the plurality of locations in the agricultural area, and generates an agricultural material application recommendation for each of the plurality of locations based on the mapping; and
   an agricultural vehicle, comprising:
      an interface unit that interfaces with the automated agricultural data collection vehicle and receives the agricultural material application recommendations from the agricultural data collection vehicle;
      an agricultural material applicator that applies an agricultural material to at least one target location in the agricultural area, wherein the at least one target location is one of the plurality of locations or a neighboring location near one of the plurality of locations; and
      a display that provides the agricultural material application recommendations to a driver of the agricultural vehicle.

2. The agricultural material application management system of claim 1, wherein the automated agricultural data collection vehicle and the agricultural vehicle communicate with each other in real-time during an agricultural material application procedure.

3. The agricultural material application management system of claim 2, wherein the interface unit receives the agricultural material application recommendations from the agricultural data collection vehicle a plurality of separate times during the agricultural material application procedure.

4. The agricultural material application management system of claim 1, further comprising:
   a cable physically connecting the automated agricultural data collection vehicle and the agricultural vehicle, wherein power is provided to the agricultural data collection vehicle from the agricultural vehicle via the cable.

5. The agricultural material application management system of claim 4, wherein the agricultural material application recommendations are provided to the agricultural vehicle from the agricultural data collection vehicle via the cable.

6. The agricultural material application management system of claim 1, wherein the receiver is a wireless receiver, and the sensor data is obtained by a sensor located in the agricultural area that is not part of the automated agricultural data collection vehicle and is wirelessly transmitted from the sensor to the automated agricultural data collection vehicle via the wireless receiver.

7. The agricultural material application management system of claim 1, wherein the receiver is a sensor that directly obtains the sensor data.

8. The agricultural material application management system of claim 1, wherein each agricultural material application recommendation comprises one of a first recommendation to increase an amount of the agricultural material applied, a second recommendation to decrease the amount of the agricultural material applied, and a third recommendation to refrain from applying the agricultural material.

9. The agricultural material application management system of claim 1, wherein the agricultural vehicle is a tractor and the agricultural material is a fertilizer.

10. The agricultural material application management system of claim 1, wherein the agricultural vehicle is an aerial vehicle.

11. An agricultural material application management system, comprising:
    an automated agricultural data collection vehicle, comprising:

a location sensor that detects a plurality of locations of the automated agricultural data collection vehicle within an agricultural area;

a receiver that receives sensor data including crop information; and a memory that stores the plurality of locations and the sensor data; and an agricultural vehicle, comprising:

an interface unit that interfaces with the automated agricultural data collection vehicle, and receives the plurality of locations and the sensor data from the agricultural data collection vehicle;

an agricultural material applicator that applies an agricultural material to at least some of the plurality of locations in the agricultural area;

a processor that generates a mapping correlating the crop information with the plurality of locations in the agricultural area, and generates an agricultural material application recommendation for each of the plurality of locations based on the mapping; and a display that provides the agricultural material application recommendations to a driver of the agricultural vehicle.

12. The agricultural material application management system of claim 11, wherein the automated agricultural data collection vehicle and the agricultural vehicle communicate with each other in real-time during an agricultural material application procedure.

13. The agricultural material application management system of claim 12, wherein the interface unit receives the plurality of locations and the sensor data from the agricultural data collection vehicle a plurality of separate times during the agricultural material application procedure.

14. The agricultural material application management system of claim 11, wherein the processor generates an additional agricultural material application recommendation for a neighboring location near at least one of the plurality of locations.

15. An agricultural material application management method, comprising:

detecting a plurality of locations of an automated agricultural data collection vehicle within an agricultural area;

receiving sensor data including crop information at the automated agricultural data collection vehicle;

storing the plurality of locations and the sensor data in a memory;

generating a mapping correlating the crop information with the plurality of locations in the agricultural area;

generating an agricultural material application recommendation for each of the plurality of locations based on the mapping;

interfacing the agricultural data collection vehicle with an agricultural vehicle to transmit the plurality of locations and the sensor data, or the agricultural material application recommendations, from the agricultural data collection vehicle to the agricultural vehicle; and displaying the agricultural material application recommendations to a driver of the agricultural vehicle.

16. The agricultural material application management method of claim 15, wherein the automated agricultural data collection vehicle and the agricultural vehicle communicate with each other in real-time during an agricultural material application procedure.

17. The agricultural material application management method of claim 16, wherein the agricultural data collection vehicle and the agricultural vehicle interface with each other a plurality of separate times during the agricultural material application procedure.

18. The agricultural material application management method of claim 15, wherein the automated agricultural data collection vehicle and the agricultural vehicle travel through the agricultural area in synchronization with each other.

19. The agricultural material application management method of claim 18, wherein the automated agricultural data collection vehicle travels to each of the plurality of locations before the agricultural vehicle.

20. The agricultural material application management method of claim 15, wherein the processor generates an additional agricultural material application recommendation for a neighboring location near at least one of the plurality of locations.

* * * * *